United States Patent [19]

Nakai et al.

[11] Patent Number: 5,011,560

[45] Date of Patent: Apr. 30, 1991

[54] METHOD OF ADHESION AND COMPOSITION THEREFOR

[75] Inventors: Yoshikazu Nakai, Itami; Tsutomu Kubota, Mishima, both of Japan

[73] Assignee: Takeda Chemical Industries, Ltd., Osaka, Japan

[21] Appl. No.: 234,159

[22] Filed: Aug. 19, 1988

Related U.S. Application Data

[63] Continuation of Ser. No. 928,656, Nov. 5, 1986, abandoned, which is a continuation of Ser. No. 700,673, Feb. 11, 1985, abandoned.

[30] Foreign Application Priority Data

| Feb. 13, 1984 | [JP] | Japan | 59-25691 |
| Apr. 5, 1984 | [JP] | Japan | 59-68636 |
| Jan. 8, 1985 | [JP] | Japan | 60-1800 |

[51] Int. Cl.$^5$ .................. B32B 1/10; B32B 31/12; C08G 18/42; C08G 18/58
[52] U.S. Cl. .................. 156/273.3; 156/331.4; 428/414; 428/416; 428/423.7; 428/424.4; 428/425.1; 428/425.3; 428/425.8; 428/463; 522/14; 522/28; 522/101; 522/103; 522/96; 522/126; 522/174
[58] Field of Search .................. 156/273.3, 330

[56] References Cited

U.S. PATENT DOCUMENTS

| 3,450,613 | 6/1969 | Steinberg | 204/159.18 |
| 3,753,755 | 8/1973 | Olson | 204/159.11 |
| 4,025,407 | 5/1977 | Chang | 204/159.14 |
| 4,092,443 | 5/1978 | Green | 204/159.11 |
| 4,239,077 | 12/1980 | Dixon | 427/208 |
| 4,245,029 | 1/1981 | Crivello | 204/159.11 |
| 4,252,592 | 2/1981 | Green | 204/159.11 |
| 4,356,050 | 10/1982 | Crivello | 156/273.3 |
| 4,388,139 | 6/1983 | Fuller | 156/330 |
| 4,426,243 | 1/1984 | Briggs | 156/330 |
| 4,552,604 | 11/1985 | Green | 427/44 |

FOREIGN PATENT DOCUMENTS

| 48-21800 | 3/1973 | Japan . |
| 52-8043 | 1/1977 | Japan . |
| 58-149971 | 9/1983 | Japan . |

OTHER PUBLICATIONS

Noomen, "Pigmented UV Dual Cure Coatings".

Primary Examiner—Marion E. McCamish
Assistant Examiner—Arthur H. Koeckert
Attorney, Agent, or Firm—Wenderoth, Lind & Ponack

[57] ABSTRACT

A method of adhesion which comprises applying a two-step reactive type tacky adhesive agent comprising (1) a non-photopolymerizable epoxy resin or isocyanate compound, (2) a curing agent therefor and (3) a compound having at least one photopolymerizable vinyl group in one molecule onto a substrate, irradiating the whole applied surface with light to develop the tackiness, and sticking the substrate together to a material to be bonded, while the tackiness is retained, followed by curing.

The method provides excellent green bonding strength and can permit the satisfactory adhesion without clamping, and can be particularly suitably utilized in the adhesion of materials to be bonded which have a curved surface difficult to be clumped.

5 Claims, No Drawings

METHOD OF ADHESION AND COMPOSITION THEREFOR

This application is a continuation of now abandoned application Ser. No. 928,656 filed Nov. 5, 1986, now abandoned, which is a continuation of application Ser. No. 700,673 filed Feb. 11, 1985, now abandoned.

The present invention relates to a method of adhesion for a two-step, reactive type photocurable tacky·adhesive agent and a composition therefor.

A tacky·adhesive agent, which exhibits satisfactory adhesiveness within a certain period of time after being applied to a substrate, thus permitting the procedure of bonding together to be conducted, and also allows a chemical reaction to go to completion after the elapse of a certain period of time, thereby demonstrating excellent bonding strength, can eliminate the necessity of clamping subsequent to the bonding together of substrates and is earnestly desired in various industrial sectors where adhesives are utilized.

The fundamental principle of adhesion lies in the wetting of surfaces to be bonded, and for the purpose of spreading uniformly over substrates, it is required of adhesives to possess a viscosity of not more than about 1 million centipoises.

In order to secure satisfactory adhesiveness, on the other hand, adhesives have to show a viscosity in the neighborhood of several ten million centipoises.

Conventional two-component, reactive type tacky·adhesive agents are designed to develop adhesiveness by allowing a fixed length of open time after the uniform application on substrates and then causing thickening to take place. In the case of non-solvent types, such a phenomenon can be achieved by allowing a chemical reaction to proceed to a limited extent, but heat and time are required. In the case of solvent types, heat for a given period of time is applied to evaporate the solvent, whereby there is encountered the problem of environmental pollution due to the evaporation of solvent.

The present inventors, with a specific view to solving the problems of conventional two-component, reactive type tacky·adhesive agents, conducted extensive investigation, and as a result, found that a two-step reactive type tacky·adhesive agent containing a component curable by light and a component curable through a chemical reaction, while remaining in the form of a non-solvent or high-solid liquid with a relatively low viscosity enough to permit uniform spreading on substrates within a certain period of time after the compounding of the two component, is applied on a substrate and exhibits satisfactory adhesiveness, upon irradiation with light through the polymerization of the photopolymerizable component, within a time as short as 0.1 to 60 seconds, whereby the substrate and other substrate are bonded together with satisfactory adhesiveness being retained, and can produce excellent bonding properties by curing the component curable through a chemical reaction to thereby form a network structure having the former and latter components mutually permeated. The finding has culminated in the present invention.

Thus, the present invention is directed toward a method of adhesion which comprises applying a two-step reactive type photocurable tacky·adhesive agent comprising (1) a non-photopolymerizable epoxy resin or isocyanate compound, (2) a curing agent therefor and (3) a compound having at least one photopolymerizable vinyl group in one molecule onto a substrate, irradiating the whole applied surface with light to develop tackiness, and adhering the substrate to a material to be bonded thereto, while the tackiness is retained, followed by curing, and toward a two-step, reactive type tacky·adhesive agent comprising (1) a non-photopolymerizable epoxy resin or isocyanate compound, (2) a curing agent therefor and (3) a compound having at least one photopolymerizable vinyl group in one molecule, in which the said agent, after being irradiated with light, exhibits a glass transition temperature of not higher than about 40° C.

The method of adhesion according to the present invention, providing excellent green bonding strength, can permit satisfactory adhesion without clamping, and can be particularly suitably utilized in the adhesion of materials to be bonded which have a curved surface difficult to be clamped.

The adhesive which constitutes a base in the two-step, reactive type tacky·adhesive agent according to the present invention includes, for example, a non-solvent or high-solid, two-component, reactive type of non-photopolymerizable epoxy-based adhesive, or two-component, reactive type of urethane-based adhesive. The non-photopolymerizable epoxy-based adhesives are ones which do not undergo photopolymerization under ordinary conditions. The resin component in the two-component reactive type of non-photopolymerizable epoxy-based adhesives is understood to comprehend non-solvent or high-solid epoxy resins, and includes, for example, glycidyl ether based epoxy resins, such as bisphenol A epoxy resins, bisphenol F epoxy resins, hydrogenated bisphenol A epoxy resins, novolac epoxy resins, polyglycidyl ethers of polyalkylene glycols being exemplified by diglycidyl ether of neopentyl glycol; glycidylamine based epoxy resins, such as triglycidylisocyanurate and tetraglycidyl-m-xylenediamine; glycidyl ester based epoxy resins, such as polyglycidyl esters of polycarboxylic acids being exemplified by diglycidyl phthalate and diglycidyl hexahydrophthalate; and cyclic aliphatic type epoxy resins, such as vinylcyclohexene dioxide, 3,4-epoxycyclohexylmethyl(3,4-epoxycyclohexane)carboxylate and bis(3,4-epoxy-6-methylcyclohexylmethyl)adipate. In addition to these, there are also mentioned epoxy-containing resins formed by the reaction of epoxy resins with polybasic acids or polyester polycarboxylic acids, polyglycidyl esters of polyester polycarboxylic acids, or polyglycidyl ethers of polyester polyols, and the like. The polybasic acid includes, for example, maleic acid (anhydride), succinic acid (anhydride), adipic acid, fumaric acid, phthalic acid (anhydride), terephthalic acid, isophthalic acid, methyltetrahydrophthalic acid (anhydride), tetrahydrophthalic acid (anhydride), sebacic acid, dodecandioic acid, azelaic acid, glutaric acid, trimellitic acid (anhydride), hexahydrophthalic acid (anhydride) and dimer acids (e.g., Bersadime ® 216, 228, 288, etc. with an acid value of 191 to 198, produced by Henkel Japan Co. of Japan). The terms "polyester polycarboxylic acid" and "polyester polyol" denote polyester polycarboxylic acids and polyester polyols obtained by esterification according to conventional methods of these polybasic acids with polyhydric alcohols, such as ethylene glycol, propylene glycol, butylene glycol, hexylene glycol, decanediol, neopentyl glycol, glycerol, trimethylolpropane, 1,4-cyclohexanedimethanol, neopentyl glycol hydroxypivalate,1,4-cyclohexanediol and hydrogenated bisphenol A, respectively.

The curing agent for the above-mentioned epoxy resins includes, for example, aliphatic polyamines, such as diethylenetriamine, triethylenetetramine, tetraethylenepentamine, dipropylenediamine, diethylaminopropylamine, menthanediamine, and isophorondiamine; aromatic amines, such as xylylenediamine, m-phenylenediamine, diaminodiphenylmethane and diaminodiphenylsulfone; polyamideamines obtained, for example, by the reaction of dimer acids (e.g., Bersadime ® 216, 228, 288, etc. with an acid value of 191 to 198, produced by Henkel Japan Co. of Japan) with diamines; mercaptan compounds, such as trimethylolpropane tris-(β-thiopropionate) and compounds represented by the formula

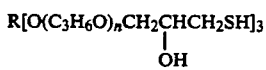

(wherein R is an aliphatic hydrocarbon; n is 1 to 2); acid anhydrides, such as phthalic anhydride, maleic anhydride, trimellitic anhydride, dodecynylsuccinic anhydride, (methyl)hexahydrophthalic anhydride and methylnadic anhydride; polybasic acids, such as dimer acids (e.g., Bersadime ® 216, 228, 288, etc. with an acid value of 191 to 198, produced by Henkel Japan Co. of Japan) and octadecanedicarboxylic acid; epoxy polymerization catalyst type of curing agents, such as 2,4,6-tris(dimethylaminomethyl)phenol, benzyldimethylamine and imidazole; and others, such as dicyandiamide, organic acid dihydrazides and phenol resins. Such curing agents can be used solely or in combinations of not less than two kinds.

The formulating ratio of epoxy resin and curing agent therefor is desirably such as: the number of epoxy groups against the number of active hydrogens in amino groups may be about 0.1 to 3.0 in the case of polyamines used as a curing agent; the number of epoxy groups against the number of thiol groups may be about 0.1 to 3.0 in the case of mercaptan compounds employed as a curing agent; the number of epoxy groups against the number of acid anhydride groups may be about 0.3 to 3.0 in the case of acid anhydrides utilized as a curing agent; and the number of epoxy groups against the number of carboxyl groups may be about 0.3 to 3.0 in the case of polybasic acids used as a curing agent.

The resin component in the two-component, reactive type urethane-based adhesives is understood to comprehend non-solvent or high-solid isocyanate compounds, and includes, for example, aromatic, aliphatic, alicyclic and aromatic-aliphatic diisocyanates, such as tolylene diisocyanate, diphenylmethane diisocyanate (which may be either in the form of crude or purified product), 3,3'-dimethyldiphenylmethane-4,4'-diisocyanate, naphthylene-1,5-diisocyanate, phenylene diisocyanate, xylylene diisocyanate, 1,6-hexamethylene diisocyanate, 1,4-tetramethylene diisocyanate, isophoron diisocyanate, hydrogenated tolylene diisocyanate, hydrogenated diphenylmethane diisocyanate and hydrogenated xylylene diisocyanate; or dimers or trimers of the above-mentioned diisocyanates, or adducts of the above-mentioned diisocyanates with active hydrogen compounds, such as adducts of the above-described diisocyanates with ethylene glycol, propylene glycol, tetramethylene glycol, neopentyl glycol, butanediol, 1,6-hexanediol, polyethylene glycol, polypropylene glycol, polytetramethylene ether glycol, trimethylolpropane, glycerol, pentaerythritol, castor oil, bisphenol A-ethylene oxide adducts and bisphenol A-propylene oxide adducts and polyesterpolyols formed by the esterification according to the conventional method of polybasic acids, such as maleic acid (anhydride), succinic acid (anhydride), adipic acid, fumaric acid, phthalic acid (anhydride), terephthalic acid, isophthalic acid, methyltetrahydrophthalic acid (anhydride), tetrahydrophthalic acid (anhydride), sebacic acid, dodecane diacid, azelaic acid, glutaric acid, trimellitic acid (anhydride), hexahydrophthalic acid (anhydride) and dimer acids (e.g., Bersadime ® 216, 228, 288 etc. with an acid value of 191 to 198, produced by Henkel Japan Co. of Japan) and aliphatic glycols, such as ethylene glycol, propylene glycol, butylene glycol, hexylene glycol, decanediol and neopentyl glycol, aliphatic polyether glycols suchas diethylene glycol and dipropylene glycol, and polyhydric alcohols, such as glycerol, trimethylolpropane, 1,4-cyclohexanedimethanol, hydroxypivalic acidneopentyl glycol ester, 1,4-cyclohexanediol and hydrogenated bisphenol A. These isocyanate compounds can be employed solely or in combination of not less than two kinds thereof.

The curing agent for the above-mentioned isocyanate compounds includes, for example, active hydrogen compounds, such as ethylene glycol, propylene glycol, tetramethylene glycol, neopentyl glycol, butanediol, 1,6-hexanediol, polyethylene glycol, polypropylene glycol, polytetramethylene ether glycol, trimethylolpropane, glycerol, pentaerythritol, castor oil, bisphenol-A ethylene oxide adducts, bisphenol-A propylene oxide adducts, and polyester polyols formed by the esterification according to the conventional method of polybasic acids, such as maleic acid (anhydride), succinic acid (anhydride), adipic acid, fumaric acid, phthalic acid (anhydride), terephthalic acid, isophthalic acid, methyltetrahydrophthalic acid (anhydride), tetrahydrophthalic acid (anhydride), sebacic acid, dodecanediacid, azelaic acid, glutaric acid, trimellitic acid (anhydride), hexahydrophthalic acid (anhydride) and dimer acids (e.g., Bersadime ® 216, 228, 288, etc. with an acid value of 191 to 198, produced by Henkel Japan Co. of Japan), and aliphatic glycols, such as ethylene glycol, propylene glycol, butylene glycol, hexylene glycol, decanediol and neopentyl glycol, aliphatic polyether glycols, such as diethylene glycol and dipropylene glycol, and polyhydric alcohols, such as glycerol, trimethylolpropane, 1,4-cyclohexanedimethanol, hydroxypivalic acidneopentyl glycol ester, 1,4-cyclohexanediol and hydrogenated bisphenol A, or there may be mentioned acrylic polymers having hydroxyl or amino groups in the side chains.

Such acrylic polymers are obtained, for example, by polymerizing in accordance with the per se known vinyl polymerization such hydroxyl-containing vinyl monomers and amino-containing vinyl monomers as N-methylol(meth)acrylamides, hydroxyethyl(meth)acrylates, hydroxypropyl(meth)-acrylates, pentaerythritol mono(meth)acrylates, allyl alcohol, monoesters of polyethylene glycol with (meth)-acrylic acids, monovinyl ether of ethylene glycol or polyethylene glycol, monovinyl ether of propylene glycol or polypropylene glycol and Placce ® FA-1 (CH$_2$=CHCOOCH$_2$CH$_2$OCO(CH$_2$)$_5$OH) produced by Daicel Chemical Industries, Ltd. of Japan), primary- or secondary-amino group containing vinyl monomers, such as aminoethyl (meth)-acrylates, N-methylamino(meth)acrylates, N- ethylaminoethyl(meth)acrylates, allylamine and diallylamine with vinyl monomers such as methyl(meth)acrylates, ethyl(meth)-acrylates, n-butyl(meth)acrylates, isobutyl(meth)acrylates, 1-ethylpropyl(meth)acrylates, 1-methylpentyl(meth)acrylates, 2-methylpentyl(meth)acrylates, 3-methylpentyl(meth)acrylates, 1-ethylbutyl(meth)acrylates, 2-ethylbutyl(meth)acrylates, 2-ethylhexyl(meth)acrylates, isooctyl(meth)acrylates, 3,5-5-trimethylhexyl(meth)acrylates, decyl(meth)acrylates, dodecyl(meth)acrylates and tetrahydrofurfuryl(meth)acrylates and acrylic acid, methacrylic acid, maleic acid, maleic anhydride, fumaric acid, maleic acid monoesters and itaconic acid, glycidyl(meth)acrylates, glycidyl allyl ether, styrene, vinyl acetate, acrylonitrile, methacrylonitrile or vinyl ether.

Or, the photopolymerizable vinyl compound to be described below in some. instances contains functional groups which are reactive with the isocyanate group, such as hydroxyl and amino groups, and in such cases, the photopolymerizable vinyl compound, as such, can be used as a curing agent, thus eliminating occasionally the necessity of employing the above-described curing agent.

These curing agents can be used, either alone or in combination of not less than two kinds thereof. Also, the per se known catalysts can be used for the isocyanate compounds and curing agents therefor.

The proportion in which the isocyanate compound and curing agent therefor are formulated is favorably in such a ratio that the sum of the number of the active hydrogen groups in the curing agent and the number of the hydroxyl groups or amino groups in the below-described photopolymerizable vinyl compound may be about 0.1 to 5.0 against a number of the isocyanate groups.

The above two-component, reactive type adhesive is admixed with a photocurable (photopolymerizable) component to impart the photocurable property. Such a photocurable component includes, for example, a photopolymerizable vinyl compound such as vinyl monomers, poly(meth)acrylates, epoxy poly(meth)acrylates, polyester poly(meth)acrylates, polyurethane poly(meth)acrylates, polybutadiene poly(meth)-acrylates, photopolymerizable vinyl oligomers and vinyl polymers.

Specific examples of the vinyl monomers include, for example, methyl(meth)acrylates, ethyl(meth)acrylates, n-butyl(meth)acrylates, isobutyl(meth)acrylates, 1-ethylpropyl(meth)acrylates, 1-methylpentyl(meth)acrylates, 2-methylpentyl(meth)acrylates, 3-methylpentyl(meth)acrylates, 1-ethylbutyl(meth)acrylates, 2-ethylbutyl(meth)acrylates. 2-ethylhexyl(meth)acrylates, isooctyl(meth)acrylates, 3,5,5-trimethylhexyl(meth)acrylates, decyl(meth)acrylates, dodecyl(meth)acrylates and tetrahydrofurfuryl(meth)acrylates, acrylic acid, methacrylic acid, maleic acid, maleic anhydride, fumaric acid, maleic acid monoesters and itaconic aicd, N-methylol(meth)acrylamides, hydroxyethyl(meth)acrylates, hydroxypropyl(meth)acrylates, pentaerythritol mono(meth)acrylates, allyl alcohol, monoesters of polyethylene glycol with (meth)acrylic acids, monovinyl ether of ethylene glycol or polyethylene glycol, monovinyl ether of propylene glycol or polypropylene glycol and Placcel® FA-1 ($CH_2=CHCOOCH_2CH_2OCO(CH_2)_5OH$) produced by Daicel Chemical Industries, Ltd. of Japan, aminoethyl(meth)acrylates, N-methylaminoethyl(meth)acrylates, N-ethylaminoethyl(meth)acrylates, allylamine, diallylamine, glycidyl(meth)acrylates, glycidylallyl ether, styrene, vinyl acetate, acrylonitrile, methacrylonitrile and vinyl ether.

Specific examples of the above-mentioned poly(meth)-acrylates include, for example, di-, tri- and tetraethylene glycol di(meth)acrylates, dipropylene glycol di(meth)acrylates, dipentamethylene glycol di(meth)acrylates, tetraethylene glycol di(meth)acrylates, tetraethylene glycol dichloroacrylate, diglycerol di(meth)acrylates, diglycerol tetra(meth)acrylates, tetramethylene di(meth)-acrylates, ethylene di(meth)acrylates, neopentyl glycol di(meth)acrylates, trimethylolpropane tri(meth)acrylates, pentaerythritol di(meth)acrylates, pentaerythritol tri(meth)-acrylates, 1,6-hexanediol di(meth)acrylates and NK ester®BPE200 (produced by Shin-Nakamura Kagaku Kogyo Co. of Japan) represented by

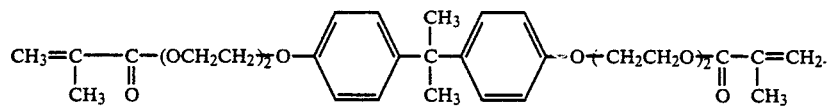

The epoxy poly(meth)acrylates include, for example, those formed by the reaction of an epoxy-containing compound with, for example, acrylic acid or methacrylic acid, and their specific examples include methacrylic acid adducts (Epoxy ester®40EM, produced by Kyoeisha Oils & Fats Co. of Japan) represented by:

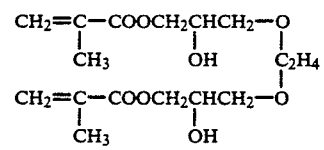

acrylic acid adducts (Epoxy ester®70PA) represented by:

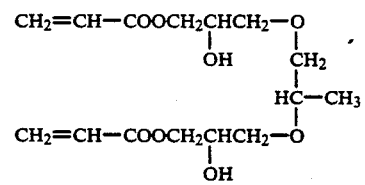

acrylic acid adducts (Epoxy ester®80MFA) represented by:

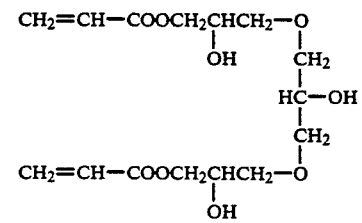

methacrylic acid adducts (Epoxy ester ®3002M) represented by:

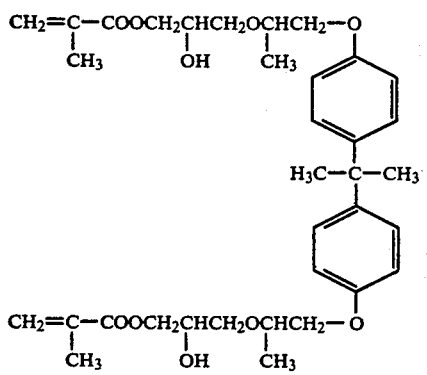

and acrylic acid adducts (Epoxy ester ®3002A) represented by:

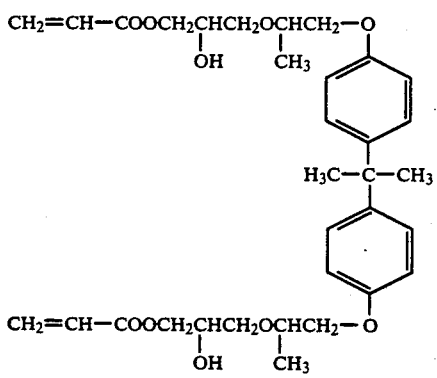

while the polyester poly(meth)acrylates includes, for example, those formed by the reaction of a polyester polyol with, for example, acrylic acid, and their specific examples include for example, HX-220 (produced by Nippon Kayaku Co., Ltd, of Japan) represented by:

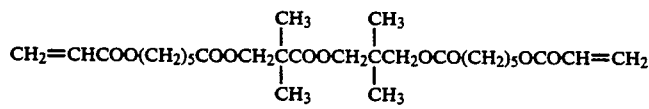

and HX-620 represented by:

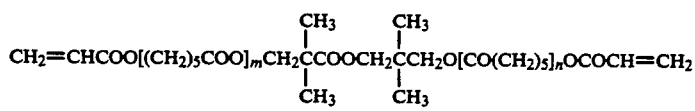

(wherein m+n=4, m, m: an integer of 1 of 3)

The polyurethane poly(meth)acrylates include, for example, reaction products of an isocyanate-containing compound, for example, aromatic, aliphatic, alicyclic and aromatic-aliphatic diisocyanates, such as tolylene diisocyanate, diphenylmethane diisocyanate (which may be either in the form of crude or purified product), 3,3'-dimethyldiphenylmethane-4,4'-diisocyanate, naphthylene1,5-diisocyanate, phenylene diisocyanate, xylylene diisocyanate, 1,6-hexamethylene diisocyanate, 1,4-tetramethylene diisocyanate, isophoron diisocyanate, hydrogenated tolylene diisocyanate, hydrogenated diphenylmethane diisocyanate and hydrogenated xylylene diisocyanate; or dimers or trimers of the above-mentioned diisocyanates, or adducts of the above-mentioned diisocyanates with active hydrogen compounds, such as adducts of the above-described diisocyanates with ethylene glycol, propylene glycol, tetramethylene glycol, neopentyl glycol, butanediol, 1,6-hexanediol, polyethylene glycol, polypropylene glycol, polytetramethylene ether glycol, trimethylolpropane, glycerol, pentaerythritol, castor oil, bisphenol A-ethylene oxide adducts and bisphenol A-propylene oxide adducts or polyester polyols formed by the esterification according to the conventional method of polybasic acids, such as maleic acid (anhydride), succinic acid (anhydride), adipic acid, fumaric acid, phthalic acid (anhydride), terephthalic acid, isophthalic acid, methyltetrahydrophthalic acid (anhydride), tetrahydrophthalic acid (anhydride), sebacic acid, dodecandioic acid, azelaic acid, glutaric acid, trimellitic acid (anhydride), hexahydrophthalic acid (anhydride) and dimer acids (e.g., Bersadime ® 216, 228, 288, etc. with an acid value of 191 to 198), and aliphatic glycols, such as ethylene glycol, propylene glycol, butylene glycol, hexylene glycol, decanediol, neopentyl glycol, aliphatic polyether glycols such as diethylene glycol, dipropylene glycol, and polyhydric alcohols, such as glycerol, trimethylolpropane, 1,4-cyclohexanedimethanol, neopentyl glycol hydroxypivalate, 1,4-cyclohexanediol and hydrogenated bisphenol A, with a hydroxyl-containnig vinyl monomer, for example N-methylol(meth)acrylamides, hydroxyethyl (meth)acrylates, hydroxypropyl (meth)acrylates, pentaerythritol mono(meth)-acrylates, allyl alcohol, monoesters of polyethylene glycol with (meth)acrylic acids, monovinyl ether of ethylene glycol or polyethylene glycol, monovinyl ether of propylene glycol or polypropylene glycol and Placcel® FA-1 ($CH_2=CHCOOCH_2CH_2OCO(CH_2)_5OH$), produced by Daicel Chemical Industries, Ltd. of Japan.

These products are normally formed by reacting one isocyanate equivalent weight of the isocyanate-containing compound with one hydroxyl equivalent weight of the hydroxylcontaining vinyl monomer.

The polybutadiene poly(meth)acrylates include, for example, those formed by the reaction of polybutadiene diol with methacrylic acid, acrylic acid, etc., and their specific examples include, for example, Quinbeam ® 101 with a vinyl equivalent of 355 and viscosity of 21,000 centipoises (25° C.) produced by Nippon Zeon Co., Ltd. of Japan.

Out of the above-described photopolymerizable vinyl compounds, particularly, vinyl compounds having at least two photopolymerizable vinyl groups per molecule, such as poly(meth)acrylates, epoxy poly(meth)acrylates, polyester poly(meth)acrylates, polyurethane poly(meth)-acrylates and polybutadiene poly(meth)acrylates, result in development of the tackiness within a short period of time after irradiation with light, and are especially suitable.

Of the above photopolymerizable vinyl compounds, those with a high viscosity consist of epoxy poly(meth)acrylates, polyester poly(meth)acrylates, polyurethane poly(meth)acrylates and polybutadiene poly(meth)acrylates, and when these high-viscosity compounds are used, other low-viscosity photopolymerizable vinyl compounds are utilized in combination therewith to produce non-solvent or high-solid liquid tacky-adhesive agents with a relatively low viscosity.

The two-step, reactive type of tacky-adhesive agents according to the present invention can be obtained by the mixing of the above-mentioned epoxy resin or isocyanate compound, curing agent therefor and photopolymerizable vinyl compound.

The proportion in which the photopolymerizable compound is used is preferably about 5 to 80 weight % against the total amount of tacky-adhesive agent, more preferably in the range of about 10 to 60 weight %.

In cases in which the base resin is an epoxy resin, with the curing agent being an amine compound and/or a mercaptan compound, the photopolymerizable vinyl compound, when admixed with the curing component agent, sometimes undergoes the Michael reaction between its vinyl groups and the curing agent, thus bringing about deterioration in storage stability, and therefore, is preferably added to the epoxy component resin which is the resin component. When the curing agent is an acid anhydride and/or a polybasic acid, such a photopolymerizable compound may be added either to the resin component or the curing component agent.

When the base resin is an isocyanate compound, further, the photopolymerizable vinyl compound in the present invention in many cases contains functional groups which are reactive such as hydroxyl or amino groups, and therefore, it is also considered common from the standpoint of improved storage stability to add such a photopolymerizable vinyl compound to the curing component agent composed principally of hydroxyl-containing compounds.

The tacky-adhesive agent which is used in the present invention, in principle, is of a two-component type. However, when the base resin for the tacky-adhesive agent is urethane-based, photopolymerizable vinyl compounds not containing functional groups reactive with the isocyanate group, such as hydroxyl group, can provide excellent storage stability even after compounded with the isocyanate compound constituting resin component into a one-component solution, and therefore permit the formulation into a one-component composition.

In the case of such a one-component type composition, tackiness is developed by irradiation with light, followed by adhering together with a material to be bonded thereto and thereafter, the isocyanate groups are allowed to undergo moisture-curing in accordance with the per se known method to produce the bonding strength or adhesiveness.

The tacky-adhesive agent which is used in the present invention comprises the above-described three components, whereby the said composition, after irradiated with light (above 0.1 second to 60 minutes), favorably exhibits a glass transition temperature of not higher than about 40° C., particularly not higher than about 20° C. When the glass transition temperature is in excess of 40° C., the resulting coating film shows inferior wettability, thus making it impossible to stick together with the other material to be bonded thereto.

The light (photo) in the above mentioned photopolymerizable vinyl compound denotes primarily ultraviolet rays having the wavelength range of about 180 nm to 460 nm, and the source of generating ultraviolet radiation includes, for example, low-voltage mercury lamp, medium-voltage mercury lamp, high-voltage mercury lamp, ultra-high-voltage mercury lamp, xenon mercury lamp, ultraviolet fluorescent lamp and carbon arc lamp. In the present invention, furthermore, there can also be used radiations, such as $\alpha$-rays, $\beta$-rays, $\gamma$-rays, X rays and electron rays.

The tacky-adhesive agent according to the present invention develops rapidly adhesiveness through irradiation with light, and when a promoter is contained therein in order to promote further the development of adhesiveness, it can produce desirable effects. When the light is ultraviolet rays, light sensitizers are used.

Suitably usable light sensitizers include, for example, benzoin compounds, such as benzoin, benzoin methyl ether, benzoin ethyl ether, benzoin isobutyl ether and benzoin octyl ether, carbonyl compounds, such as benzil, diacetyl, diethoxyacetophenone, 2-hydroxy-2-methylpropiophenone, 4'-isopropyl-2-hydroxy-2-methylpropiophenone, methylanthraquinone, acetophenone, benzophenone and methyl benzoylformate, sulfur compounds, such as diphenyldisulfide and dithiocarbamate, naphthalene compounds, such as $\alpha$-chloromethylnaphthalene, metal salts, such as iron chloride, and anthracene. The amount of the light sensitizer to be used is in the range of about 0.01 to 20 parts by weight against 100 parts by weight of photopolymerizable vinyl compound, preferably in the range of about 0.1 to 10 parts by weight.

When the light is ionizing radiations, such as electron rays and $\gamma$-rays, the tacky-adhesive agent develops adhesiveness swiftly without the use of light sensitizer, and there is no need to use light sensitizers particularly.

The tacky-adhesive agent of the present invention can allow addition of, in addition to the above principal components, per se known fillers, softeners, antioxidants, tackifying resins, adhesion promoters and plasticizers.

This tacky-adhesive agent is a non-solvent or high-solid liquid which exhibits a viscosity relatively low enough to permit the uniform application to substrates within a limited period of time of about 50 hours after mixing the resin component of two-component, reactive type adhesive and a curing agent therefor with a photopolymerizable vinyl compound, and can be applied uniformly to substrates. In the present invention, the mixture is first applied to a substrate. The application rate is in such an amount as may provide a coating film of a thickness of about 10 to 300 $\mu$, preferably about 20 to 200 $\mu$. After the application, the whole applied surface is irradiated with light, whereby there develops such a degee of tackiness as may permit the adhering together of the substrate in a length of time as short as about 0.1 to 60 seconds, and the improved green bonding strength produced can allow satisfactorily the adhesion not only under pressure but also without clamping. After the sticking together to a material to be bonded, the component being curable through the chemical reaction at room temperature or under heating may be allowed to cure.

As the substrate or material to be bonded, there can be used every kinds of materials, such as metal, glass, plastics, wood, particle board, paper, slates, rubber, and decorative sheet.

According to the present invention, there appears, with a period of time as short as about 0.1 to 60 seconds, tackiness of such a magnitude as may enable the sticking together of materials to be bonded. The tackiness is in the range of about 1 to 10 kg/25×25 mm$^2$ as holding strength.

The method of the present invention can permit the adhesion of materials to be bonded to substrates not only having the flat surface but also the curved surface difficult to be clamped. In the case of a substrate having a curved surface, the substrate may only be bonded under pressure to the adhesive-applied surface by such a means as a roller.

The examples are described below to illustrate the present invention more specifically.

In the examples, the term "part" denotes a part by weight.

EXAMPLE 1

To 100 parts of an epoxy resin (Epotohto ® YD-128; produced by Tohto Kasei Co. of Japan, with an epoxy equivalent of 189 and a viscosity of 13,000 centipoises (25° C.)) was added 50 parts of a mixture consisting of 60 parts of an epoxy diacrylate (Epoxy ester ®3002A; produced by Kyoeisha Oils & Fats Co. of Japan, with a vinyl equivalent of 300 and a viscosity of 50,000 centipoises (25° C)), 15 parts of n-butyl acrylate, 15 parts of 2-ethylhexyl acrylate, 10 parts of glycidyl methacrylate and 3 parts of 2-hydroxy-2-methylpropiophenone to thereby make the Resin Component 1.

On the other hand, 100 parts of a polyamideamine formed by the reaction of 572 parts of a dimer acid (Bersadime ® 288; produced by Henkel Japan Co. of Japan, with an acid value of 196) with 210 parts of diethylenetriamine was admixed with 5 parts of 2,4,6-tris(dimethylaminomethyl)phenol, and the resulting resin (with a viscosity of 42,000 centipoises (25° C.)) was made the Curing Agent 1. 100 parts of the Resin Component 1 was mixed with 50 parts of the Curing Agent 1, and the mixture was applied on the surface of an FRP, followed by irradiation, 10 cm apart from the above for 5 seconds, with ultraviolet rays generated by a high-voltage mercury lamp, whereby the applied surface, with its ball tack(Note) of 29/32 inch, showed good tackifying strength. Subsequently, this tacky. adhesive agent was applied to the FRP surface having a curved-surface portion, and after the whole applied surface was irradiated with light in the same manner as described above, a 0.7-mm thick ABS plate treated with corona discharge was adhered to the substrate. The assembly was allowed to stand without clamping at 30° C. for 15 hours, and 90° C. peeling-off bonding strength was measured in the measuring atmosphere of a tensile rate of 100 mm/min, temperature of 23° C. and relative humidity of 50%, with the result that the ABS ruptured at not less than 10 kg/25 mm and that the curved surface portion also showed good adhesion. With the assembly formed by treating iron/iron ground with #240 sandpaper used as substrates under the same ultraviolet irradiation conditions and curing conditions, the tensile shear bonding strength was measured at a tensile rate of 5 mm/min under a measuring atmosphere (23° C. and relative humidity of 50%), and was found to be 170 kg/cm$^2$. The mixture consisting of 100 parts of the Resin Component 1 and 50 parts of the Curing Agent 1 showed a pot life of 60 minutes at 25° C.

EXAMPLE 2

To 100 parts of polytetramethylene ether glycol (with an OH equivalent of 325) having a molecular weight of 650 was added 150 parts of a photopolymerizable component obtained by the compounding of 40 parts of an epoxy dimethacrylate (Kyoeisha Oils & Fats Co. of Japan, Epoxy ester ®3002M; with a vinyl equivalent of 314 and a viscosity of 50,000 centipoises (25° C.)), 20 parts of a polyester diacrylate (produced by Nippon Kayaku Co., Ltd. of Japan, HX-220; with a vinyl equivalent of 270 and a viscosity of 100 centipoises (25° C.)), 20 parts of Placce ® FA-1 produced by Daicel Chemical Industries Ltd. of Japan, 20 parts of tetrahydrofuryl methacrylate and 2 parts of methyl benzoylformate to thereby make the Curing Agent 2 (with an OH equivalent of 394). On the other hand, 853 parts of crude diphenylmethanediisocyanate was reacted with 184 parts of castor oil and 132 parts of polypropylene glycol (with an OH equivalent of 500) having a molecular weight of 1000, and the resulting product (with an amine equivalent of 200) was made the Resin Component 2. 20 parts of the Resin Component 2 was mixed with 25 parts of the Curing Agent 2, and the ball tack(Note) was measured under the same light irradiation conditions as Example 1 and found to be 25/32 inch. Subsequently, this tacky.adhesive agent was applied (thickness of coating film of 100 μ) to a #240 sand-paper ground iron plate having a curved surface portion, and after the whole applied surface was irradiated with light in the same manner as described in Example 1, a 0.5-mm thick polypropylene plate was adhered to the substrate. The assembly was allowed to stand without clamping at 25° C. for 24 hours, and 90° peeling-off bonding strength was measured in the measuring atmosphere of a tensile rate of 100 mm/min, temperature of 23° C. and relative humidity of 50%, with the result that the polypropylene ruptured at not less than 8 kg/25 mm and that the curved surface portion also showed good adhesion.

Then, the tensile shear bonding strength was measured with the substrates similar to the one in Example 1 under the light-irradiation, curing and measuring conditions similar to those of Example 1, and found to be 150 kg/cm$^2$. The mixed solution consisting of 20 parts of the Resin Component 2 and 25 parts of the Curing Agent 2 showed a pot life of 50 minutes at 25° C. (Note): Ball tack ... In accordance with the J. Dow method. Method of measuring the tackifying strength:

32 different steelballs having a diameter ranging from 1/32 inch to 32/32 inch made available for the test are allowed to roll down a slope at 30° of angle of inclination which contains a 10-cm long surface applied with a tacky material, with an approach run of 10 cm, and the diameter of the largest-sized steel ball which stops on the said 10-cm long surface applied with a tacky material is taken as a measure for the adhesiveness of such a material.

EXAMPLE 3

A 60 parts portion of a mixture consisting of 30 parts of Epoxy ester ®3002A as used in Example 1, 30 parts of triethylene glycol diacrylate, 30 parts of 1-ethylpropyl methacrylate, 10 parts of glycidyl allyl ether and 5 parts of benzoin ethyl ether was added to 100 parts of Epotohto ® YD-128 to form Resin Component 3.

On the other hand, 5 parts of 2,4,6-tris(dimethylaminomethyl)phenol was added to 100 parts of the polyamideamine obtained by reacting 572 parts of Bersadime® 288 as used in Example 1 with 295 parts of triethylenetetramine to form a resin (with a viscosity of 13,000 centipoises (25° C.)), and the resin was made Curing Agent 3.

100 parts of Resin Component 3 was mixed with 40 parts of Curing Agent, and the mixture was applied to an FRP surface, which was irradiated, from above and 10 cm apart, with ultraviolet light generated by a high-voltage mercury lamp for 7 seconds. A corona-discharge treated, 1.5 mm thick polyethylene plate having a warped, curved surface formed was adhered to the FRP substrate using a roller, and the as was allowed to stand at 25° C. for 24 hours, whereby the FRP and polyethylene plate showed good adhesion. The mixture consisting of 100 parts of Resin Component 3 and 40 parts of Curing Agent 3 exhibited a pot life of 80 minutes at 25° C.

EXAMPLE 4

By reacting 1350 parts of a reaction product of 1000 parts of polypropylene glycol having a molecular weight of 1000 and an OH equivalent of 500 and 350 parts of tolylene diisocyanate with 235 parts of hydroxyethyl acrylate, there was obtained a urethane diacrylate. 50 parts of a mixture consisting of 70 parts of the urethane diacrylate, 20 parts of n-butyl acrylate, 10 parts of hydroxyethyl acrylate and 3 parts of 2-hydroxy-2-methylpropiophenone was added to 50 parts of Epotohto®YD-128 as used in Example 1 to make Resin Component 4.

100 parts of Resin Component 4 was mixed with 45 parts of Curing Agent 3 as used in Example 3, and the mixture was applied (to a thickness of coating film of 100 $\mu$) to an iron plate ground with #240 sand paper, followed by irradiation 10 cm apart from above with ultraviolet rays generated by a high-voltage mercury lamp for 15 seconds. A 50 $\mu$ thick polyethylene terphthalate film was adhered to the iron plate with the bonding surface area of 25 mm×25 mm=625 mm$^2$, and immediately thereafter, a weight of 4 kg was put on the lower end of the non-bonded portion of the polyethylene terephthalate film. The bonded assembly was suspended in an atmosphere of 25° C., whereby there was no slippage observed at the bonded area one day later, with the bond being cured.

Then, this tacky-adhesive agent was applied on a sheet of particle board (to a thickness of coating film of 100 $\mu$), and the whole applied surface was irradiated with light in the same manner as described above, followed by sticking together with use of rollers of a 0.6 mm thick decorative sheet of natural wood having warpage and curved surface formed thereon. The bonded assembly, upon standing without clamping at 25° C. for 24 hours, showed excellent bonding, without swelling produced between the particle board and decorative sheet.

EXAMPLE 5

By mixing 100 parts of an acrylic polyol (with an average molecular weight of 150,000 and an OH equivalent of 580) formed from the vinyl polymerization of 80 parts of n-butyl acrylate and 20 parts of hydroxyethyl acrylate, with 60 parts of n-butyl acrylate, 26 parts of hydroxyethyl acrylate and 3 parts of 2-hydroxy-2-methylpropiophenone, there was prepared Curing Agent 5 (with an OH equivalent of 482 and a viscosity (at 25° C.) of 1,600 cps.)

50 parts of an adduct of tolylene diisocyanate with trimethylol propane (Takenate®D-103 produced by Takeda Chemical Industries, Ltd. of Japan; with an amine equivalent of 328 and a viscosity (at 25° C.) of 1,000 cps) used as Resin Component 5 was mixed with 100 parts of Curing Agent 5, and the mixture was applied on an iron plate ground with #240 sand paper (to a thickness of coating film of 100 $\mu$), followed by irradiation 10 cm apart from above with ultraviolet rays generated by a high-voltage mercury lamp for 3 seconds. A 50 $\mu$ thick polyethylene terephthalate film was adhered to the iron plate with the bonding surface area of 25 mm×25 mm=625 mm$^2$, and immediately thereafter, a weight of 4 kg was put on the lower end of the non-bonded portion of the polyethylene terephthalate film. The bonded assembly was suspended in an atmosphere of 25° C., whereby there was no slippage observed at the bonded area one day later, with the bond being cured.

Then, this tacky-adhesive agent was applied to a sheet of lauan plywood (to a thickness of coating film of 100 $\mu$), and the whole applied surface was irradiated with light in the same manner as described above, followed by sticking together with use of rollers of a 0.5 mm thick melamine-resin sheet having warpage and curved surface formed thereon. The bonded assembly, upon standing without clamping at 25° C. for 24 hours, showed no swelling between the lauan plywood and decorative sheet, with excellent bonding.

Using birch lumber/birch lumber having 12 mm of thickness as substrate and material to be bonded, with the same light irradiation and curing conditions being employed, compressive shear bonding strength, as measured at a compression rate of 5 mm/min under the measuring conditions (23° C. and humidity of 50%), was found to be 110 kg/cm$^2$, revealing complete material breakdown (area of the bonded portion was 25 mm×25 mm=625 mm$^2$).

Also, the mixed solution consisting of 50 parts of Resin Component 5 and 100 parts of Curing Agent 5 showed a pot life at 25° C. of 12 hours.

EXAMPLE 6

By mixing 100 parts of an acrylic polyol (with a weight average molecular weight of 200,000 and an OH equivalent of 650) formed from the vinyl polymerization of 60 parts of n-butyl acrylate, 20 parts of methyl methacrylate and 20 parts of hydroxyethyl methacrylate, with 50 parts of n-butyl acrylate, 30 parts of 2-ethylhexyl acrylate, 35 parts of hydroxyethyl acrylate and 3 parts of methyl benzoylformate, there was prepared Curing Agent 6 (with an OH equivalent of 479).

20 parts of crude diphenylmethane diisocyanate was mixed with 100 parts of Curing Agent 6, and the mixture was applied on a sheet of particle board (to a thickness of coating film of 100 $\mu$). The whole applied surface was irradiated with light under the same conditions as described in Example 5, and a 0.6 mm thick decorative sheet of natural wood having warpage and curved surface formed thereon was adhered to the particle board by the use of rollers. The bonded assembly, upon standing without clamping at 25° C. for 24 hours, showed excellent bonding, without swelling produced between the particle board and decorative sheet.

REFERENCE EXAMPLE 1

The Resin Component 1 and Curing Agent 1 as used in Example 1 were mixed, and the mixture was applied to an FRP surface having a curved surface portion. A coronadischarge treated, 0.7 mm thick ABS plate incorporated with fillers was adhered to the FRP substrate using a roller, and the part susceptible to light irradiation under the same light irradiation conditions as described in Example 1 was irradiated with light. The assembly was allowed to stand without clamping, with the result that the ABS plate got peeled off and did not adhere to the FRP substrate.

We claim:

1. A method of adhesion which comprises (a) applying onto a substrate having a curved surface a liquid two-step reactive type tacky-adhesive agent comprising (1) a non-solvent or high-solid isocyanate compound, (2) a curing agent therefor and (3) a component consisting of a vinyl compound having one photopolymerizable vinyl group per molecule and a vinyl compound having at least two photopolymerizable vinyl groups per molecule, the weight of the former vinyl compound being in the range of 30 to 100 weight % of component (3) and the porportion of component (3) being about 5 to 80 weight % of the total amount of the tacky-adhesive agent, (b) irradiating the whole applied surface with light to develop tackiness at a glass transition temperature of the applied agent after irradiating with light not exceeding about 20° C., and (c) adhering the substrate to a material to be bonded to the said curved surface through the said adhesive agent without clamping, while the tackiness is retained, followed by curing at room temperature.

2. A method of adhesion as claimed in claim 1, wherein the component (1) is an isocyanate compound and the component (2) is an acrylic polyol.

3. A method of adhesion as claimed in claim 1, wherein the component (3) is one selected from the group consisting of poly(meth)acrylates, epoxy poly(meth)acrylates, polyester poly(meth)acrylates and polyurethane poly(meth) acrylates.

4. A method of adhesion as claimed in claim 1, wherein the amount of the application rate is one providing a coating film of a thickness of about 10 to 300 µ.

5. A method of adhesion as claimed in claim 1, wherein the light is ultraviolet light generated by a high-voltage mercury lamp.